Figure 1:
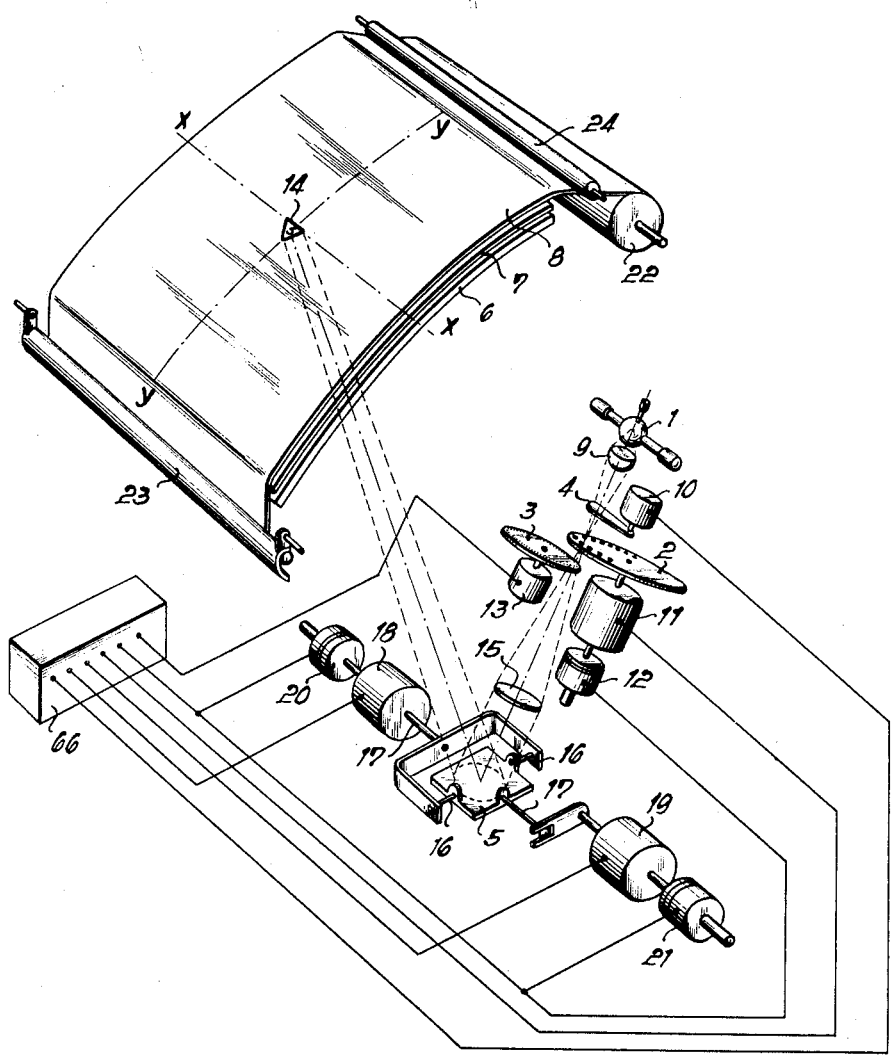

March 29, 1960

H. BEHRMANN ET AL 2,930,668

POSITION INDICATOR

Filed July 16, 1956

3 Sheets-Sheet 1

INVENTORS
Herwart BEHRMANN
Felix KUDRITZKI by F D R...
Att'y

March 29, 1960

H. BEHRMANN ET AL 2,930,668

POSITION INDICATOR

Filed July 16, 1956

3 Sheets-Sheet 3

INVENTORS
Herwort BEHRMANN
Felix KUDRITZKI by F D Prager

Att'y.

United States Patent Office 2,930,668
Patented Mar. 29, 1960

2,930,668
POSITION INDICATOR

Herwart Behrmann, Berlin-Nikolassee, and Felix Kudritzki, Berlin, Tempelhof, Germany, assignors to Askania-Werke A.G., Berlin-Friedenau, Germany, a corporation of Germany Application July 16, 1956, Serial No. 599,672

Claims priority, application Germany July 16, 1955

2 Claims. (Cl. 346—8)

This invention relates to apparatus for indicating the positions of a movable object or series of objects, for instance of airplanes and for also indicating important pertinent data such as weather conditions, operational incidents and other information of interest. While being useful in many fields such as shipping, civil aeronautics and the like, the invention has particular utility in aerial warfare and defense and will be described as applied in this field.

It is a primary object of the apparatus to provide panoramic indication and warnings, in the sense of providing clear and comprehensive pictures of the manifold positions and movements of the various planes involved, which pictures must allow rapid and accurate determination of relative speed, among other things, and must also provide records for subsequent review and analysis.

A further object is to avoid undesirable complications of both construction and operation, while providing a high degree of flexibility in the indication of data transmitted from different points in different sequence. In pursuance of this object it is clear from the start that the apparatus of this invention serves to operate much more flexibly than any mechanically scribing device possibly could; for instance it must and will freely allow the indicator beams to cross and recross one another, by the use of indicator beams provided in principle by pencils of light, for the indication of plane position, construction, flight data, time etc.

It is, however, a further object to improve also over known and obvious applications of light pencil markers; in fact, to improve thereover in several respects. For one thing, the light pencil records so far provided and used in fields similar to that of the new apparatus could be developed and fixed only in special darkrooms and after undesirable delays; by contrast, it is desired to make such records instantly available, in daylight. It is further desired to incorporate suitable reference data such as mapping contours or coordinates or other reference systems, in the indicated or recorded pictures, while avoiding confusion which can easily be caused by excessive or non-selective use of such aids. It is also important to safely avoid any confusion between different planes and their respective positions, in spite of the use of random sequences of transmission of data.

Still another basic object is to arrange so that readings of relative position as well as relative speed and the like can be taken readily, without cumbersome or confusing measurements and computations and also without errors caused by optical aberrations, while nevertheless retaining the known advantages of records taken on flat material such as photographic film or paper.

Accordingly the invention provides a system which operates, in a preferred embodiment, by means of ultraviolet light pencils playing over light-transmissive, ultraviolet-sensitive sheet material; and desirably, certain data and coordinates or reference materials are additionally provided, for purposes of momentary information and indication only and without recordation, by means of light beam units using ordinary visible light which does not, or at least not appreciably, sensitize the record material. Details concerning the arrangement of said material, the transmission and reception of signals for the same, the motion control over the different light sources or control elements such as mirrors, will now be described with reference to the drawing appended hereto.

In this drawing, Figure 1 is a diagrammatic, perspective view of a receiver forming part of a system built in accordance with this invention; the view being limited, for purposes of relative simplification, to the devices for generating, directing and utilizing the ultraviolet light beams, or some of them. All details of no or little importance for the basic concept are omitted.

Figure 2:
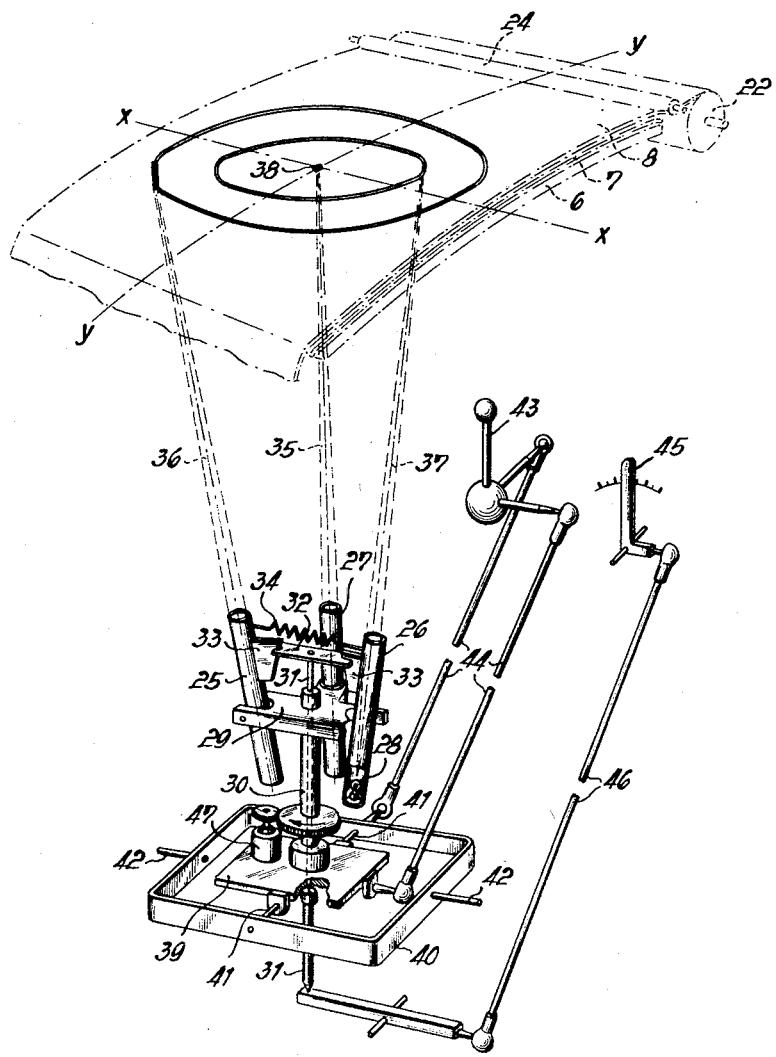

Figure 2 is a similar view of the same receiver, limited however to the devices for generating, directing and utilizing the beams of ordinary light, or some of them. The light pencil utilizing record field has been shown in both views 1 and 2, from slightly different angles of view, in order to disclose the cooperation of the two systems of Figures 1 and 2, which actually form parts of a single system (although the elements of Figure 2 can sometimes be left unused or can even be structurally omitted).

Figure 3:
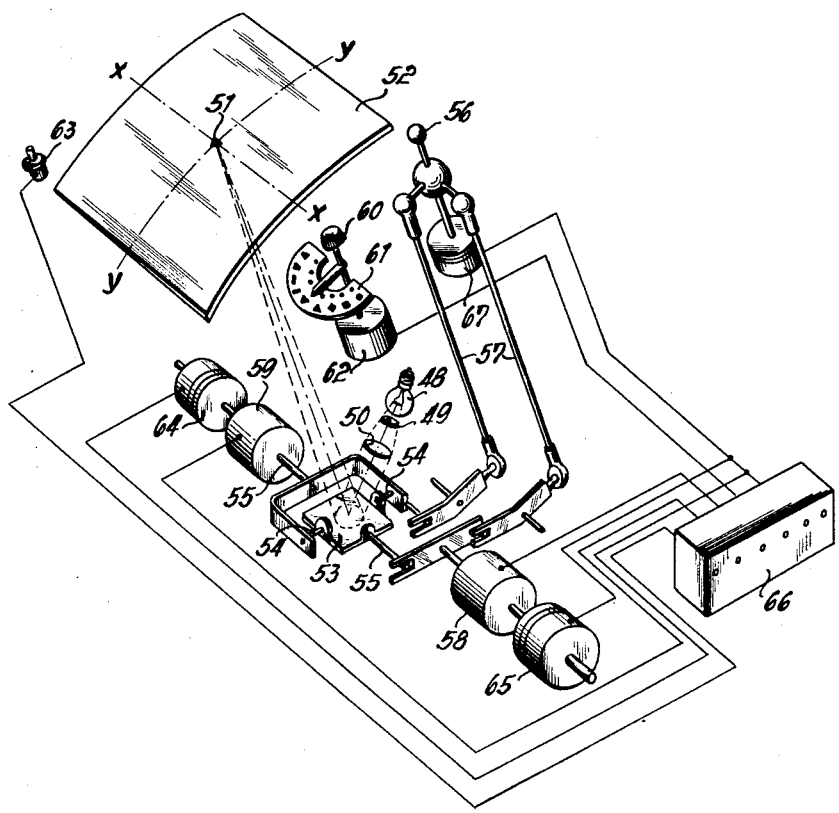

Figure 3 is a similar view of a transmitter forming part of a system built in accordance with this invention. Again the view is limited to the most basic elements of significance for this invention.

Referring first to Figure 1, there is shown a source 1 of strong and largely ultraviolet light, such as a high pressure mercury arc lamp with an envelope of quartz or the like. The ultraviolet light from this source passes through indicia-forming means 2, 3 to a shutter 4, which may or may not pass it over a gimbal-jointed mirror 5 to the indicator-recorder surface; this surface comprising a cylindrically curved, transparent support plate 6, a transparent map or coordinate carrier 7 thereon, and either in contact with this carrier or as a part thereof a light-transmissive, ultraviolet-sensitive self developing desirably inscribable film or paper 8. Light pencils generated at 1 and controlled at 2, 3, 4 and 5, play over the system 7, 8, which can be used in the manner of a lectern or of a tracing unit. In order to make the light pencils sharp and strong there may be used a stationary optical unit 9, desirably of quartz.

The shutter 4 is actuated by a solenoid device 10, either plain or polarized, whereas the indicia units 2, 3, may be controlled respectively by an electromagnetic rotary field system 11 with arresting magnet 12 and by a ratchet relay 13; it being understood that various rotary motors and the like can be used in lieu of a rotary solenoid or of other elements, mentioned above. This arrangement allows suitably short exposure of light pencils from source 1 and optical unit 9 and suitable shaping of such pencils, the latter for instance by forming the indicia carriers 2 and 3 as stencils or as transparent discs and by incorporating for instance exposure count numbers in carrier 2 and other symbols, as mentioned, in carrier 3.

Precise focussing of the light pencil onto the record plane 7, 8 is achieved by a quartz lens 15, interposed between the indicia units 2, 3 and the mirror 5; said mirror being suspended on gimbal joints 16, 17 so that the light pencil can play over the said record plane. Adjustment of the mirror, on the two gimbal joints, is provided by a pair of rotary field systems 18, 19, having arresting magnets 20, 21 and/or eddy current dampers, known to the art and not shown in detail.

The transparent record support 6 is shown as having single or cylindrical curvature in order to avoid spherical aberration in at least one plane, while allowing smooth positioning of the sensitized material 8; this material being removed from a supply roll 22 and ultimately stored on a receiver roll 23. The support 6 also has a suitably drawn and dimonsioned map or similar reference carrier 7 thereon, showing for instance the land or sea area under observation. In addition, holding or clamping means 24 for the sensitized material may be associated with this support.

As mentioned above, it is further desirable, in many if not all embodiments of this invention, to provide for simple measurement of distances and the like; and in order to preserve a clear record of the principal objects under observation it is more particularly desirable not to effect the distance measurements by the same ultraviolet light pencils which serve for the main indications, but by means or procedures of more momentary nature. The structure providing this particular system of light pencils for merely momentary use is separately illustrated in Figure 2, except that the representation of elements 6, 7, 8, 22 and 24—the reading and recording means—is here repeated in phantom lines, in a slightly different perspective. The difference in persepective or viewing angle used in Figures 1 and 2 is connected with fact that the mechanisms of the two figures, while cooperating with the same recorder plane, are mounted in different positions relative to this plane, and each mechanism is viewed, in the respective figure, so as to disclose the details thereof most clearly and most readily.

The distance measuring apparatus comprises a system of projectors 25, 26, 27; each projector comprising a tubular housing with an incandescent lamp 28 therein for producing a beam of visible light, for instance white light. Each projector housing also has a collector lens system or the like therein, for focussing the corresponding white light pencil on the record plane 7, 8. In this plane, as already mentioned, no appreciable sensitization or blackening is effected by this kind of light. However, the light is visible, desirably in form of substantially circular marks or distance rings, produced by rotating the system of projectors on a mounting 29 by means of rotatable shaft 30 coaxial with said rings. Three projectors are shown but additional projectors can be provided, in order to facilitate rapid and direct readings of distances. Further, distance readings in desired units of measurement, regardless of the cruising height of the observed plane or planes, are facilitated by an arrangement which allows rapid and proportional adjustment of all projectors and which can be used while the projectors revolve about their shaft. This arrangement is provided by a sliding rod 31 in the shaft 30, having a wiper 32 for cam means 33 on projector housings 25, 26, said housings being swingably supported on their mounting 29 and being biased to keep the cams on the wiper, by spring means 34. One projector 27 is not so adjustable, being permanently trained on the intersection of the axis of shaft 30 and the reading plane 7, 8, where it produces a visible, non-recording center point 38. Suitable coordinates X—X and Y—Y may be construed with this point as a zero point; they may or may not coincide with similar coordinates X—X, Y—Y which may be constructed with the object image 14 as a center, see Figure 1; in other words the system 38 may be zeroed on image 14 or on some other object image projected and recorded by the system of Figure 1.

For such zeroing and other movements, the projector shaft 30 is mounted on a gimbal-jointed table 39 with frame 40 and joints 41, 42, movable by a ball joint mounted lever 43, through a system of links 44. The aforementioned, proportional adjustments of the projector inclinations, on the other hand, are effected by a bell crank 45, connected with the shaft-centered rod 31 by a link 46. The rotation of the projector system is effected by motor means 47 on the table 39.

In lieu of the table 39 there may be used a rigid support for the projector and angle-adjustor system in conjunction with a gimbal-mounted mirror system, similarly as shown at 5.

While the adjustment of the measuring system of Figure 2 is shown as being purely manual and effected by hand levers 43, 45, it is preferred to move and adjust the principal parts of the device automatically, for instance by electric or magnetic means. By such actuation of the indicating and recording system of Figure 1 it becomes possible to combine the receiver with one or several transmitters remotely controlling the receiver; and of course more than one receiver may be serviced in this manner. It is further possible to obtain the transmitted signals from automatic, self-sighting stations. However, Figure 3 shows a transmitter with manual control features.

This transmitter has an indicator surface similar to that of the receiver, as is suggested by showing once more the coordinates $xx$ and $yy$. By means of the similarity of the indicator surfaces, spherical aberrations caused by the merely single curvature of the recording film and support are avoided and it becomes unnecessary to indulge in complicated, correcting computations.

As a light source the transmitter may use a plain lamp 48 with a collector system 49 and a focussing lens 50 for projecting a luminous point 51 onto the viewing surface 52, via mirror 53 which is suspended at 54, 55 in the same manner as the receiver mirror 5 at 16, 17. The transmitter mirror 53 is moved by a manual, ball joint mounted lever 56, through linkage 57; this mechanism being similar to that shown at 43, 44 in Figure 2 but being shown as having an electromagnetic arresting device 67, in order to minimize accidental shifting of the adjusted lever when fixing the same; this device may be controlled from the lever itself.

The two components of the movements of the transmitter mirror 53 are signalled to the receiver system 18, 19 by means of rotary field generator systems 58, 59, and the selection of indicia to be used at 2, 3 is signailed by means of selector switch means or the like, controlled by a rotary knob 60 and a system of combined contactor elements 61, which selector system may also include an additional rotary field unit 62. The signalling operations emanating from sources 58, 59, 62 can be caused to occur during a single, short interval pursuant to previous storage of the data in form of transmitter element position; for this purpose there is provided a signal release push button 63. Correct information storage is insured by the use of suitable arresting systems 64, 65 for the aforementioned rotary field transmitter elements, and by the further use of a suitable unit 66 for telegraphic, radio or other transmission of the element data. The details of such a unit—which may also insure the proper sequence of transmissions originated at random by a plurality of transmitters—are known to the art and need not be illustrated herein.

In the operation of the present system, one of several transmitters of the type shown in Figure 3 cause the appearance, in one or several receiver devices of the type shown in Figure 1, of consecutive ultraviolet light signals, diagrammatically represented by the central dot and surrounding triangle 14 in Figure 1; and upon the reception of two or more such light signals—recorded in a receiver upon the release of the light printing push button 63 in a transmitter—the receiving operator may, if desired, determine their distances from one another or from other objects by the measuring system of Figure 2, the circles of which can be manually centered with the dot 14, without any resulting confusion or difficulty.

More particularly the operation of the transmitter is as follows:

The pencil of white or similar light, generated by source 48 and system 49, 50 in the transmitting and supervising device is manually directed to the point 51 on surface 52, by means of mirror 53 controlled by lever 56; said point corresponding with a visual observation of an object to be reported to the receiver or receivers. Spherical or other aberration of light pencils so directed may be corrected in full or in part by suitable coordinate systems in said plane 52 or by equivalent means or procedures known to the art; and insofar as such aberration or the like is not corrected, the information received at the remote stations can still be kept correct, by the uniformity of curvatures in the transmitting and receiving surfaces, as described. Likewise no error is introduced by the use of white light or the like in the transmitter and of ultraviolet light in the receiver, if and as the optical systems 9, 15, 49, 50 are suitably corrected.

When the transmitter indication signal 51 has been adjusted properly the coordinates thereof are thereby stored in 66 for the rotary field units 58, 59. Next the corresponding indicia—as determined by well-known coding procedures or the like—are selected on the dial 61, for instance by rotating the pointer of knob 60 to the outwardly pointing triangular mark as shown and by additionally selecting one of the marks on the inner segment of indicia forming part of the dial. These operations store corresponding information in the units 62, 66. Completion of the operation of the lever 56 causes arresting of the systems 58, 59 by the units 64, 65; and operation of push button 63 energizes the programming portion of the unit 66 so that, as soon as previously scheduled transmissions of other senders have been completed, those corresponding to said stored items of information are performed. Thereupon the receiver is ready for transmissions from elsewhere, and the process can be repeated. Completion of the receiving operation can be evidenced at the transmitter by signal means, not shown.

Numerous modifications are possible with respect to the operations described and also with respect to most of the structural elements shown and to several of the features of combination which have been pointed out in this description of one particular system in accordance with the invention.

We claim:

1. In apparatus for indicating and recording movements of objects, such as air planes: a transparent carrier plate having a coordinate system, such as a map, disposed thereon; a sheet, disposed on said carrier and coordinate system, substantially not sensitive to visible light but adapted, without application of developers, to blacken at points of the sheet exposed to ultraviolet light and thereby to form a permanent record, and further adapted to transmit visible light so that the blackened points of the sheet and the coordinate system on the carrier are visible through the sheet; a pair of projector systems disposed below said carrier plate, one of said systems including a source of ultraviolet light, optical means for focussing a beam of such light, through the carrier plate, onto selected points of said sheet, and aperture means interposed between said source and said carrier plate and adapted so to form the beam of ultraviolet light as to focus it onto said sheet in form of indicia, identifiable with said objects; the other projector system including a source of visible light and optical means for focussing beams of the latter light, through the carrier plate, onto areas of said sheet coordinated with said selected points whereto the beam of ultraviolet light is focussed, in such a way that the latter light provides coordinates, added to those of said coordinate system, at said points, whereby the latter coordinates, together with the coordinate system and the blackened points, are visibly indicated through the sheet; and a mechanism responsive to movement of the objects, for directing both projector systems toward uniformly selected points of the coordinate system.

2. Apparatus as described in claim 1, wherein the first-named projector system includes a small optical element so interposed between the source of ultraviolet light and the carrier plate that the beam of ultraviolet light passes directly from the element to the carrier plate, said element forming part of said mechanism responsive to movement of the objects, and the carrier plate being curved about said element.

References Cited in the file of this patent

UNITED STATES PATENTS

| | | |
|---|---|---|
| 575,202 | Bedell | Jan. 12, 1897 |
| 1,753,781 | Ford | Apr. 8, 1930 |
| 1,792,264 | Alexanderson | Feb. 10, 1931 |
| 2,255,771 | Golay | Sept. 16, 1941 |
| 2,413,300 | Dunn et al. | Dec. 31, 1946 |
| 2,521,667 | Neyhart | Sept. 5, 1950 |
| 2,580,427 | Hieland | Jan. 1, 1952 |
| 2,760,840 | Gordon | Aug. 28, 1956 |
| 2,784,397 | Branson et al. | Mar. 5, 1957 |
| 2,862,782 | Cann | Dec. 2, 1958 |